United States Patent
Beaudet et al.

(10) Patent No.: US 12,526,491 B2
(45) Date of Patent: Jan. 13, 2026

(54) SYSTEM FOR ACQUIRING A COLOUR IMAGE AND AN INFRARED IMAGE OF A SCENE

(71) Applicant: IDEMIA IDENTITY & SECURITY FRANCE, Courbevoie (FR)

(72) Inventors: Jean Beaudet, Courbevoie (FR); Baptiste Chu, Courbevoie (FR); Jean-François Siwek, Courbevoie (FR); Sylvain Maillard, Courbevoie (FR)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 231 days.

(21) Appl. No.: 18/405,170

(22) Filed: Jan. 5, 2024

(65) Prior Publication Data
US 2024/0267602 A1  Aug. 8, 2024

(30) Foreign Application Priority Data
Feb. 3, 2023  (FR) ...................................... 23 01041

(51) Int. Cl.
*H04N 5/335* (2011.01)
*H04N 23/11* (2023.01)
*H04N 23/12* (2023.01)
*H04N 23/55* (2023.01)
*H04N 23/56* (2023.01)
*H04N 23/611* (2023.01)
*H04N 23/84* (2023.01)

(52) U.S. Cl.
CPC ............. *H04N 23/11* (2023.01); *H04N 23/12* (2023.01); *H04N 23/55* (2023.01); *H04N 23/56* (2023.01); *H04N 23/611* (2023.01); *H04N 23/84* (2023.01)

(58) Field of Classification Search
CPC ....................................................... H04N 23/12
See application file for complete search history.

(56) References Cited

U.S. PATENT DOCUMENTS

| 2017/0316195 A1* | 11/2017 | Rieul | ..................... G06V 40/40 |
| 2022/0405365 A1* | 12/2022 | Yoo | ......................... G06V 40/16 |
| 2024/0062388 A1* | 2/2024 | Lind | ...................... H04N 23/12 |

FOREIGN PATENT DOCUMENTS

| EP | 3 242 249 A1 | 11/2017 |
| FR | 3 102 324 A1 | 4/2021 |

OTHER PUBLICATIONS

French Preliminary Search Report and Written Opinion issued Jun. 19, 2023 in French Application 23 01041 filed on Feb. 3, 2023, 9 pages.

* cited by examiner

*Primary Examiner* — Gary C Vieaux
(74) *Attorney, Agent, or Firm* — Oblon, McClelland, Maier & Neustadt, L.L.P.

(57) ABSTRACT

An acquiring system including an image-acquiring device, sensitive to visible and infrared wavelengths, including a sensor; an objective configured to focus light input into the acquiring device onto the sensor, a dual-band bandpass filter being placed in front of the sensor; a processing module configured to separate, once output by the sensor, the infrared image (IIR) and the visible image (Ivis) and to define at least one signal to be servo-controlled and an associated infrared-signal control setpoint depending on which at least one artificial light source is driven; the at least one artificial light source illuminating the scene including an artificial infrared light source.

15 Claims, 4 Drawing Sheets

SYSTEM FOR ACQUIRING A COLOUR IMAGE AND AN INFRARED IMAGE OF A SCENE

The invention relates to a method for acquiring a colour image and an infrared image of a scene, as well as to the acquiring system implementing said method.

The invention is particularly applicable to technical fields such as security, in which it may be used to recognize biometric information, in particular a face, of an individual.

PRIOR ART

To produce an anti-fraud facial recognition system, a camera system that allows both a near-infrared image of a face and an image in the visible spectrum to be acquired simultaneously is conventionally used.

In order to reduce the cost and bulk of such a system, document FR3102324 discloses a device allowing the two images to be combined on a single image sensor, this RGB image-acquiring device comprising no infrared-cut filter but comprising a high-pass filter configured to attenuate the blue component of the light so as to allow infrared information to be collected using blue photosites. This device offers a good resolution of the green component; however, in the luminous environments in which such a device is used, there may be very large differences in level between the infrared and the visible, this making it difficult or even impossible to exploit both infrared and visible images at the same time, due to the limited dynamic range of the image sensors. In addition, with a single set of exposure parameters such as exposure time and gain, this device does not allow both images to be reconstructed correctly.

Use cases in which the differences in level are very large between the infrared and visible include in particular:
- luminous environments without natural ambient light, i.e. comprising ambient light only from artificial sources, such as illumination by way of LEDs (LED being the acronym of Light-Emitting Diode), because these environments contain almost no infrared or near-infrared light signals, but only light signals in the visible;
- luminous environments the natural light of which is filtered by means, for example, of an anti-heat film placed on windows, because these environments also contain only very little infrared light signal;
- dark environments, because in complete darkness no signal is received.

One solution may consist in adding to the device lighting that emits in the visible, also called white lighting, and lighting that emits in the infrared, when the two cameras are separate, each being sensitive to a single type of lighting, either visible or infrared, but in the case of a single camera sensitive to both wavelengths, direct application of this solution is inappropriate. In addition, integration of two cameras creates architecture, cost and space constraints.

The present invention aims to mitigate at least some of these drawbacks, and potentially leads to other advantages.

SUMMARY OF THE INVENTION

The invention relates to a system for acquiring a colour image and an infrared image of a scene, said acquiring system comprising:
- an image-acquiring device, said device being sensitive to visible and infrared wavelengths, comprising:
   a sensor;
   an objective configured to focus light input into the acquiring device onto the sensor, a dual-band band-pass filter being placed in front of the sensor, and in particular between the objective and said sensor;
   a processing module connected to said image-acquiring device and configured to separate, once output by the sensor, the infrared image and the visible image and to define at least one signal to be servo-controlled and an associated control setpoint, said at least one control setpoint being an infrared-signal control setpoint and/or visible-signal control setpoint depending on which at least one artificial light source is driven;
- the at least one artificial light source illuminating said scene, said at least one source comprising an artificial infrared light source emitting a light signal in the infrared and/or an artificial visible light source emitting a light signal in the visible.

This acquiring system allows, with a single camera, and therefore an advantage in terms of compactness, two (infrared and visible) images that are usable, for biometric recognition or visual-code reading, to be obtained under all luminous conditions.

For example, the dual-band bandpass filter could consist of an array of filters.

Advantageously, said image-acquiring device comprises a dual-band bandpass filter:
- in the case of a sensor with at least four different photosites, the first passband of the filter is configured to let pass visible wavelengths, in particular wavelengths shorter than 650 nm, and in the case of a sensor with three different photosites, the first passband of the filter is configured to attenuate the blue component of the light, in particular with a first passband extending for example between 530 and 650 nm; and
- the second passband is configured to let pass infrared wavelengths, in particular the second passband extends from 800 to 875 nm;

this in particular allows, by virtue of the restricted infrared band, repeatability to be obtained in the rendering of the infrared images versus external luminous conditions, the spectrum of which is thus controlled.

For example, in these sensors, the four different photosites in particular comprise red, green, blue and infrared photosites, and the three different photosites are in particular red, green and blue photosites, recalling that, according to the invention, in the case of such a sensor with three photosites, the latter photosite is sensitive only to infrared, as a result of application of the filter, this allowing a good acquisition of faces since the blue component is almost absent.

Advantageously, the second passband extends from 760 nm to 800 nm, this allowing a sufficient infrared signal to be collected even in the case of presence of an anti-heat film, because the latter blocks from around 800 nm. Specifically, without this extended passband, in the case of an anti-heat film there could be more than 10 klux of visible and almost no infrared, and hence the system would have to be able to provide infrared illumination capable of generating the same signal level as the visible illumination of 10 klux to distinguish the infrared. By virtue of this broadening of the passband, there is enough infrared to obtain an image, without the need for infrared lighting, the specification of which may be lowered as it needs to be able to generate a signal level equivalent to visible illuminance of only 1000 lux, so as to respond to the use case corresponding to strong artificial ambient light (i.e. artificial light not emitted by the system), generated by an LED for example.

Advantageously:
the artificial light source emitting in the infrared is configured to emit, in a working-distance range, in particular from 40 to 100 cm, a signal equivalent to the signal generated by bright ambient visible light, in particular 1000 lux, it for example being a light-emitting diode at 850 nm, the spectrum of which extends from 800 to 875 nm and/or the artificial light source emitting in the visible is configured to satisfactorily illuminate in complete darkness, in particular 50 lux, at a working distance of about 70 cm;

this makes it possible to have powerful visible and infrared or near-infrared light sources without running any risk or causing the user any discomfort (glare), the brightness of the infrared illumination potentially being modulated, in particular between 0 and the equivalent of 1000 lux.

Advantageously, the system comprises another image-taking device sensitive only in the visible, synchronized with the acquiring device and the exposure parameters of which are controlled independently of those of the acquiring device, this allowing stereoscopy and thus fraud of all types to be detected at low cost.

Advantageously, the other device may comprise a monochrome sensor or a sensor with at least red, green and blue photosites, this allowing stereoscopy to be obtained at low cost.

The invention also relates to a method for acquiring a colour image and an infrared image of a scene, said acquiring method comprising steps of:
receiving an image from an image-acquiring device sensitive to visible and infrared wavelengths;
processing said received image, this separating the infrared image and the visible image and defining at least one signal to be servo-controlled and an associated control setpoint, said at least one control setpoint being an infrared-signal control setpoint and/or visible-signal control setpoint depending on which at least one artificial infrared and/or visible light source is driven;
the method having the same advantages as the system.

Advantageously, the received image contains metadata, such as the gain and exposure time specific to said received image.

Advantageously, the processing step comprises a step of detecting an object in the colour and/or infrared image and of determining the distance between the detected object and said acquiring device, this allowing the additional signal produced by the artificial illumination of the system on the object to be estimated.

Advantageously, the processing step comprises a step of computing at least two metrics from all or part of the image, the first metric characterizing the infrared signal, the second metric characterizing the visible signal, this allowing the two types of signals to be quantified and then to be able to be compared, in particular with each other.

Advantageously, said part of the image is a region of interest of the image delineating said detected object, said object in particular being a body part or information, such as a visual code, in particular printed on a physical document, this allowing computation of the metrics to be limited to a region of interest in the image, such as a face in the context for example of an application to facial recognition, or such as information in the case of application to reading physical documents.

Advantageously, the at least two metrics are computed as being at least the average overall or said part of the image on each wavelength channel of said characterized signal, this making it possible not to work with images close to saturation.

Advantageously, the processing step comprises:
a step of estimating a component of the first metric characterizing an amount of infrared signal due to ambient infrared, i.e. infrared not emitted by the at least one artificial infrared and/or visible light source, and;
a step of computing the ambient illumination distribution, in particular in the form of the ratio of the amount of the component of the first metric characterizing the infrared signal due to ambient infrared to the second metric, and;
a step of comparing said distribution with a predetermined target distribution, the infrared-signal control setpoint being dependent on said comparison, and the visible-signal control setpoint in particular being dependent on said comparison;
this allowing the light distribution to be computed simply and in a way that consumes few resources.

Advantageously, said predetermined target distribution is a function of the ratio of the infrared digital level to the visible digital level, said digital levels in particular being determined so that the sum of these two setpoints is less than half the maximum signal that the camera is able to reproduce. Specifically, given that, in the camera, the visible channels are also sensitive to infrared, the sum of these two setpoints is preferably less than half the maximum digital level of the signal $N_{max}$ that the camera is able to reproduce, for example $N_{max}=1023$ in the case of a camera with a 10-bit output, so as to avoid saturation and maintain a sufficient margin.

Advantageously, the visible-signal control setpoint is dependent on said comparison, in that if the computed ambient illumination distribution is greater than the target distribution then the signal servo-controlled is the infrared signal to the infrared setpoint and otherwise the signal servo-controlled is the visible signal to the visible setpoint, this allowing the setpoint to be achieved even in the case of lower ambient infrared, recalling that there are hardly any opposite use cases, i.e. cases where there is a large excess of infrared in the scene.

Advantageously, the processing step comprises:
a step of computing an exposure parameter of the acquiring device to be applied, such as gain and/or exposure time, in particular depending on the ratio of the at least one control setpoint to said associated signal to be servo-controlled, to achieve said at least one control setpoint;
and/or
a step of computing a drive command for the artificial infrared and/or visible light source;
this allowing the control setpoint of the signal to be servo-controlled to be achieved by means of easily controllable parameters.

Advantageously, said exposure parameters (in particular gain and exposure time) to be applied are in particular determined so that their product is equal to the product of said parameters being applied multiplied by a ratio of the setpoint to be servo-controlled to the servo-controlled signal, this allowing the servo-control to be carried out in a proportional and linear manner.

Advantageously, the step of computing the drive command for the artificial infrared light source of the system is performed by first computing the additional infrared signal required to achieve the infrared-signal control setpoint given the ambient infrared signal, by subtracting the infrared-signal control setpoint from said ratio multiplied by the ambient infrared signal: $S_{IRadditional}'=C_{IR}-Ratio \cdot S_{IRambient}$, then computing a duty cycle to be applied to the infrared light source.

Advantageously, the drive command for the artificial infrared light source of the system is produced by modulating duty cycle, this allowing a signal equivalent to a visible illuminance between 0 and 1000 lux to be generated in the working distance range.

Advantageously, in the step of computing the drive command for the artificial visible light source of the system
  if the white illumination is turned off, and the product of the exposure parameters exceeds a predetermined turn-on threshold, then the white illumination is turned on;
  if the white illumination is turned on, and the product of the exposure parameters is below a predetermined turn-off threshold, then the white illumination is turned off.

Advantageously, the drive command for the artificial visible light source of the system is binary, this allowing simple control through hysteresis.

Advantageously, the acquiring method comprises an initializing step that performs an iterative scan of configurations until detection of the object, each configuration comprising at least one exposure parameter, such as gain and/or exposure time, and an intensity parameter of the at least one artificial light source, the values of said parameters being set to predetermined values in each configuration;
  this allows the sought object to be detected regardless of the luminous environment, since the set values of the parameters of each configuration correspond to optimums in different use cases, and as many configurations as identified use cases are tested one after another iteratively until the sought object is "picked up".

Advantageously, the predetermined target distribution is defined in the initializing step.

Advantageously, said configurations are recorded in the form of a table in the processing module.

Advantageously, the acquiring method according to the invention is implemented by the processing module of the device according to the invention.

The invention also relates to a method for authenticating a body part, characterized in that it comprises:
  acquiring a colour image and an infrared image of said body part using the acquiring method according to the invention, and in that the detected object is a body part; and
  authenticating the body part based on said colour and infrared images;
  said authenticating method has the same advantages as the acquiring method, and allows biometric recognition.

The invention also relates to a device for authenticating a body part, comprising:
  an image-acquiring system according to the invention; and
  the processing module being configured to detect a body part based on the received image and to perform an authentication of said detected body part based on said colour and infrared images;
  this has the same advantages as the acquiring system according to the invention and allows biometric authentication, in particular through use of the visible image to "recognize" the person and of the infrared image to verify the authenticity of the face (in other words to detect potential fraud).

The invention also relates to a computer program, comprising instructions for implementing, by means of a device, the acquiring method according to the invention, when said program is executed by a computing unit of said device, said program having the same advantages as previously mentioned. The computing unit may in particular be that of the processing module of the device according to the invention.

The invention further relates to a storage means, storing a computer program comprising instructions for implementing, by means of a device, the acquiring method according to the invention, when said program is executed by a computing unit of said device, said storage means having the same advantages as previously mentioned. The computing unit may in particular be that of the processing module of the device according to the invention.

BRIEF DESCRIPTION OF THE DRAWINGS

The invention will be better understood and its advantages will become more clearly apparent on reading the following detailed description, which is given by way of completely non-limiting indication, with reference to the appended drawings, in which.

Identical elements shown in the aforementioned figures have been identified by identical reference numbers.

DETAILED DESCRIPTION

Figure 1:
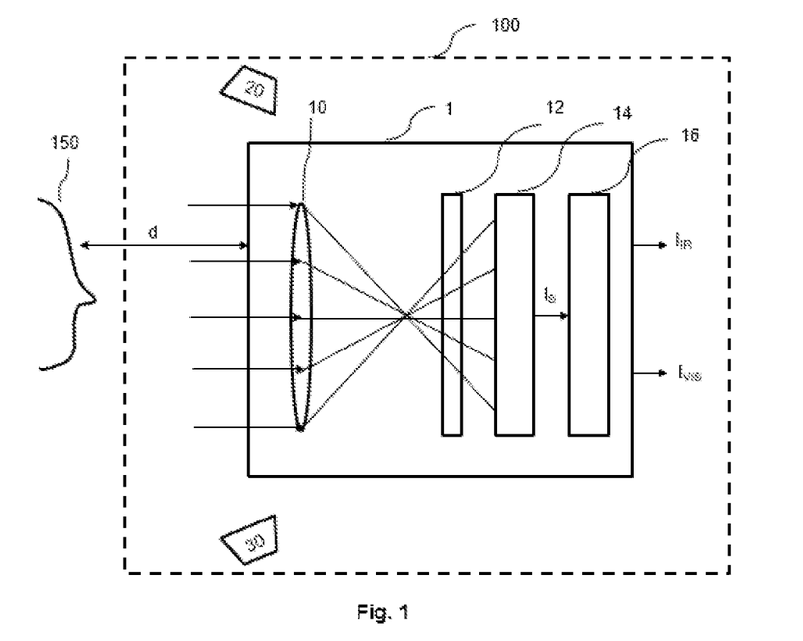
FIG. 1 schematically shows an image-acquiring system according to one embodiment of the invention.

FIG. 1 illustrates an image-acquiring system according to one embodiment of the invention.

The image-acquiring system 100 comprises an image-acquiring device 1 comprising an objective 10 which comprises at least one lens. The objective 10 is configured to focus the light input into the system, and more precisely into the acquiring device 1, onto a sensor 14, such as a CCD sensor (CCD standing for Charge Coupled Device) or CMOS sensor (CMOS standing for Complementary Metal-Oxide-Semiconductor). The sensor 14 is composed of a plurality of photosites. The image-acquiring device 1 also comprises a dual-band bandpass filter 12 placed in front of the sensor 14 such that each photosite of said sensor sees only a single colour, and in particular between the objective 10 and said sensor 14. The dual-band bandpass filter 12 may in particular be bonded to the objective or be a treatment-produced layer on the objective or consist of a treatment of the glass of the objective 10, or indeed be positioned in front of the objective. As a variant, the filter 12 could be a filter array, the filters of the array in particular being placed in different positions on the optical path, a high-pass filter for example being placed upstream of the objective and a colour-filter array being placed between the objective and the sensor.

The sensor 14 may comprise only three different photosites or at least four different photosites.

In the case of a sensor 14 comprising only three different photosites, the first passband of the dual-band bandpass filter 12 is configured to attenuate the blue component of the light, so as to collect infrared information on photosites initially dedicated to blue, and hence each photosite of the sensor 14 sees only a single colour: the red channel is thus sensitive to red and infrared via a first photosite, the green channel is sensitive to green and infrared via a second photosite, and the infrared channel is sensitive to infrared via a third photosite; the first passband therefore extends, for example, between 530 and 650 nm. The obtained device 10 is then called an RG-NIR device (RG-NIR standing for Red-Green-Near-Infrared).

In the case of a sensor 14 comprising four different photosites, the first passband of the dual-band bandpass filter 12 is configured so as to let pass visible wavelengths, such that each photosite of the sensor 14 sees only one colour: the red channel is thus sensitive to red and infrared via a first photosite, the green channel is sensitive to green and infrared via a second photosite, the blue channel is sensitive to blue and infrared via a third photosite, and the near-infrared (NIR) channel is sensitive to infrared via a fourth photosite, the first passband covering wavelengths in particular shorter than 650 nm.

Regardless of the sensor 14, the second passband of the filter 12 is configured to let pass infrared wavelengths, the second passband for example extending from 790 to 875 nm, and preferably extending from 760 nm to 800 nm, so as to collect a sufficient infrared signal even in the case of presence of an anti-heat film, this type of film blocking wavelengths around 800 nm, without really requiring the specification of the infrared lighting to be significantly higher.

The acquiring device comprises no infrared-cut filter, and therefore it is sensitive to infrared on all its channels.

An acquiring device 1 with a sensor 14 composed solely of three photosites is in particular obtained using an acquiring device consisting, for example, of a conventional RGB camera (RGB standing for Red-Green-Blue) from which the infrared-cut filter has been removed and in which the colour-filter array is replaced by a filter designed to let pass only red, green and infrared (IR). The obtained device 1 is then called an RG-NIR device (RG-NIR standing for Red-Green-Near-Infrared).

An acquiring device 1 with a sensor 14 composed of at least four photosites is for example obtained using an RGB-NIR camera (RGB-NIR standing for Red-Green-Blue-Near-Infrared) associated with a dual-band bandpass filter, also called a dual-band notch filter, that passes all the visible, i.e. in particular between 400 nm and 650 nm, and that passes in the infrared, i.e. in particular between 800 nm and 875 nm, but that blocks the rest. The obtained device 1 is then called an RGB-NIR device (RGB-NIR standing for Red-Green-Blue-Near-Infrared). The difference with respect to the preceding acquiring device 1 with a sensor 14 composed solely of three photosites is that it lets pass blue (between 400 nm and 530 nm) instead of blocking it.

The acquiring device 1 also comprises a processing module 16. The processing module 16 receives as input a raw image $I_B$ from the sensor 14 and generates an infrared image $I_{IR}$ and a colour image $I_{VIS}$. A raw image consists of the photonic information obtained after the incident photons have been converted by the photosites into a digitized electrical signal.

In the case of a sensor 14 with only three photosites, the processing module 16 is configured to calibrate, by determining calibration parameters, in a known manner, the image-acquiring device 1.

Similarly, in the case of a sensor 14 with at least four photosites, the image-acquiring device 1 is calibrated in a known manner.

The processing module 16 is also configured to generate an infrared image $I_{IR}$ and a colour image $I_{VIS}$ from a raw image $I_B$ acquired by the sensor 14 and from determined calibration parameters. The processing module 16 is therefore able to implement the method for generating the images $I_{IR}$ and $I_{VIS}$. Advantageously, the processing module 16 generates images $I_{IR}$ and $I_{VIS}$ that are synchronized.

The acquiring device 1 may comprise other well-known elements of conventional RGB cameras. These elements are not shown in FIG. 1. The elements of the objective 10 may comprise anti-reflection optical treatments to increase signal-to-noise ratio in the acquired images. The acquiring device 1 generally comprises a microlens array positioned above the sensor 14, the role of which is to optimize collection of light by the photosites. The acquiring device 1 also comprises a signal-processing module (not shown in FIG. 1) at the output of the sensor 14. Its role is to reconstruct, pixel by pixel, the two missing pieces of colour information, via a "demosaicing" algorithm. The document by Alleyson et al titled "*Linear demosaicing inspired by the human visual system*" published in April 2005 in IEEE Transactions on Image Processing 14 (4), 439-449 is one example of such an algorithm.

The signal-processing module and the processing module 16 may be integrated into one and the same module or indeed may be separate modules.

The acquiring device 1 advantageously allows colour images $I_{VIS}$ to be obtained that have a good resolution of the green component, this being particularly important for algorithms, such as facial recognition algorithms, working with images of the skin. The acquiring device 1 allows infrared images $I_{IR}$ to be obtained at the same time.

The acquiring system 100 here comprises two artificial light sources 20,30 illuminating said scene, the first artificial light source 20 emitting a light signal in the infrared and the second artificial light source 30 emitting a light signal in the visible.

Said artificial sources 20,30 are positioned so as to illuminate the scene, and in particular the object 150, here a body part, represented by a face shape.

The infrared first artificial light source 20 is dimensioned so as to make it possible to obtain, on the sensor 14, a signal that is able to be equivalent to the signal generated by very strong visible light, for example of about 1000 lux. The infrared illumination may therefore be controlled so as to be modulated in intensity between zero and the equivalent of about 1000 lux. This infrared first artificial light source 20 for example consists of one or more light-emitting diodes (LEDs) at 850 nm, the spectrum of which extends approximately from 800 to 875 nm.

The visible second artificial light source 30, also called the white light source, is dimensioned to allow a sufficient signal to be obtained in complete darkness without causing the user discomfort glare—it generates an illuminance of for example 50 to 100 lux at the working distance of about 70 cm.

Figure 2:
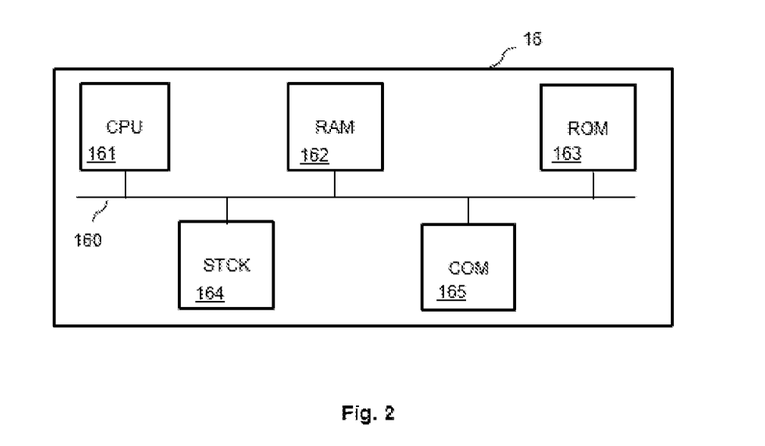
FIG. 2 schematically illustrates an example of hardware architecture of a processing module of the image-acquiring system according to one embodiment.

FIG. 2 schematically illustrates an example of hardware architecture of the processing module 16. The processing module 16 then comprises, connected by a communication bus 160: a processor or CPU (CPU standing for Central Processing Unit) 161; a random-access memory or RAM 162; a read-only memory or ROM 163; and at least one communication interface 165 for example allowing the processing module 16 to communicate with the sensor 14 of the acquiring device 1. Optionally, the processing module 16 comprises a storage unit 164 such as a hard disk or a storage-medium reader, such as an SD card reader (SD standing for Secure Digital).

The processor 161 is capable of executing instructions loaded into the RAM 162 from the ROM 163, from an external memory (not shown), from a storage medium (such as an SD card), or from a communication network. When the processing module 16 is turned on, the processor 161 is capable of reading instructions from the RAM 162 and of executing them. These instructions form a computer program causing the processor 161 to implement the methods described with reference to the following figures.

Preferably, the module 16 is of centralized architecture, but it may also be implemented in the form of an architecture that is distributed, both in terms of data and of hardware or software components, especially in the case of dematerialized computer resources.

The methods described with reference to the following figures may be implemented in software form through execution of an instruction set by a programmable machine, for example a digital signal processor (DSP), a microcontroller or a graphics processing unit (GPU), or be implemented in hardware form by a dedicated component or machine, for example a field-programmable gate array (FPGA) or an application-specific integrated circuit (ASIC).

Figure 3:
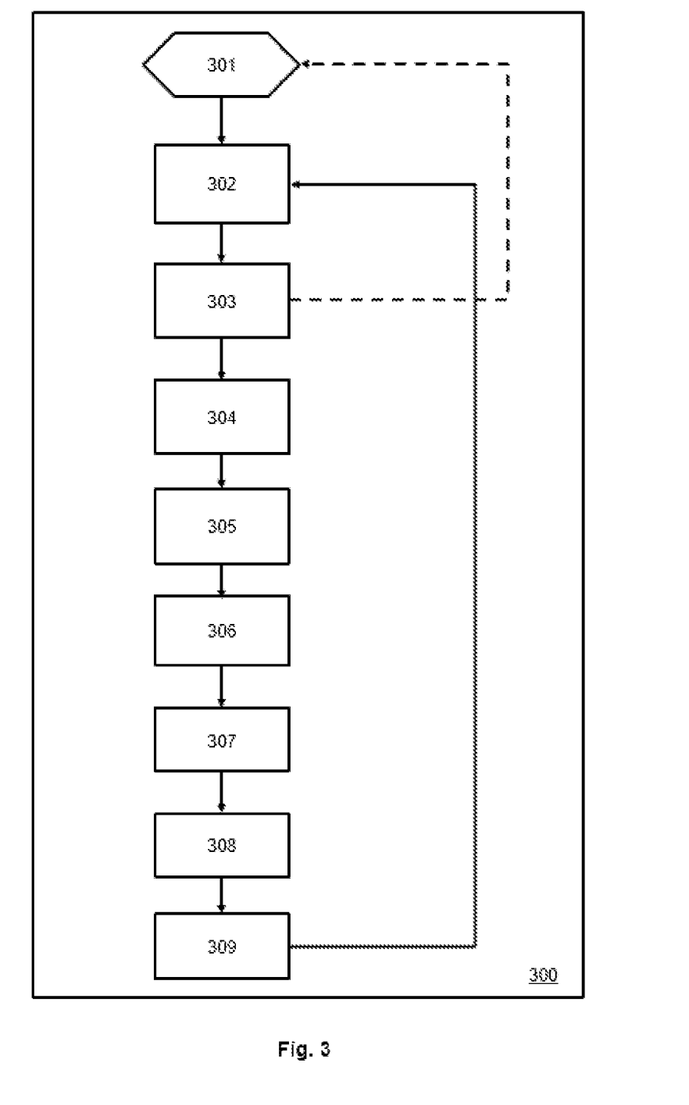
FIG. 3 illustrates a method for acquiring an infrared image and a colour image according to one embodiment.

FIG. 3 illustrates a method for acquiring an infrared image and a colour image according to one embodiment applied to an acquiring system 100 in particular comprising a sensor 14 comprising only three photosites as well as an infrared light source 20 and a visible light source 30. It should nevertheless be noted that, in another embodiment, the system could not comprise a visible light source 30, the infrared light source 20 being in this case the only one driven according to the method, for example in the case of an acquiring system the use conditions of which exclude complete darkness.

The first step shown here of the acquiring method 300 is an initializing step 301 in which exposure parameters, such as gain and/or exposure time, and intensity parameters of the at least one artificial light source of the acquiring system 100, are set to predetermined values.

Preferably, the initializing step 301 also comprises a sub-step of determining target digital levels for the infrared and visible signals, as well as a predetermined target distribution of said signals: $C_{IR}/C_{visible}$; nevertheless, this sub-step could form part of another step of the method 300, for example the comparing step 306. $C_{visible}$ and $C_{IR}$ are the target digital levels to which it is desired to servo-control the signal in the visible image and infrared image, respectively. These digital levels are determined depending on how the images are to be used, and in particular depending on the needs of the algorithms, which are in particular biometric algorithms (recognition, and fraud detection). Given that, in the photosites of the sensor 14, the visible channels are also sensitive to infrared, the sum of these two setpoints must necessarily be less than the maximum digital level $N_{max}$ that each photosite is able to reproduce—for example $N_{max}=1023$ in the case of an acquiring device 1 with a 10-bit output. In order not to work with images close to saturation, a sufficient margin should be maintained. For example, these target digital levels are thus determined so that: $C_{IR}+C_{visible}<N_{max}/2$.

For example, $C_{visible}=120$ and $C_{IR}=240$ (for 10-bit images, the signal is divided between 1024 channels ranging from digital level 0 to 1023), recalling that these values are here dimensioned with respect to weak light, i.e. here with a gain of 4, which is here configured to be the maximum gain so as to limit noise in the image, because if there is more light these targets will not necessarily be achieved but image quality will be sufficient. This results in a predetermined target distribution of said signals, said target distribution here being $C_{IR}/C_{visible}$: the ratio of the infrared digital level to the visible digital level.

After the initializing step has been completed, the method 300 for acquiring a colour image and an infrared image of a scene is carried out using said exposure parameters.

Step 302 is a step of receiving an acquired image from the image-acquiring device 1 sensitive to visible and infrared wavelengths. The image is acquired with the parameters defined in the preceding iteration, namely: exposure time of the sensor 14, gain of the sensor 14, intensity of the infrared light source 20, intensity of the white light source 30. To guarantee the image and these parameters are correctly associated, they are in particular stored in the form of metadata associated with the acquired image, so that, when the image is received, these metadata are included in the transferred image. This association may alternatively be carried out by means of the solution presented in patent application FR2212301.

The step of processing said received image itself comprises a plurality of steps. The processing separates the infrared image and the visible image and defines at least one signal to be servo-controlled and an associated control setpoint, said at least one control setpoint being an infrared-and/or visible-signal control setpoint depending on which at least one artificial infrared and/or visible light source is driven. The processing is implemented by the processing module 16 of the acquiring system 100.

More precisely, the processing step comprises a step 303 of detecting an object in the image and of determining the distance d between the detected object and said acquiring device 1. Objects are for example detected in the image in a known manner by means of an artificial-intelligence algorithm or by means of a neural network, such as described for example in the article "*You only look once: Unified, real-time object detection*", by Redmon, J., Divvala, S., Girshick, R., & Farhadi, A. (2016), Proceedings of the IEEE Conference on Computer Vision and Pattern Recognition (pp. 779-788). The object 150 sought is for example here a face, and the face of interest chosen is for example the closest face. A region of interest (ROI) corresponding to the chosen face is defined, this region of interest for example being rectangular. The image used to implement this detecting and distance-determining step 303 is preferably the (composite) raw image $I_B$ or the colour image $I_{vis}$, but it could also be the infrared image $I_{IR}$.

The distance d from the face 150 to the device is also estimated, for example depending on the size of the object in the image in pixels, and in light of the intrinsic characteristics of the camera (focal length and pixel size in particular, which are known parameters, or may even form part of the metadata associated with the image when it is acquired). This estimate of the distance d is approximate but sufficient; another more precise method for estimating the distance d will be defined below.

Preferably, in the case where no object is detected in the received first image, the method loops back, as shown by the dashed arrow, to the initializing step 301, which carries out an iterative scan of configurations with image acquisition and analysis until the sought object is detected in the acquired image. Each configuration comprises said exposure parameters, such as gain and/or exposure time, and intensity parameters (expressed in the table below in duty cycle, ranging from 0 to 1) of the at least one artificial light source, the values of said parameters being set to predetermined values in each configuration.

Thus, if the sought object is a face, the aim is to provide images allowing a potential face to be detected as soon as possible, regardless of the ambient luminous conditions, and in particular when the object is back lit as then simple automatic gain control based on the average of the complete image or a set region thereof would be inadequate. An initialization mode is here defined depending on the sought object: in face mode, the acquiring system is thus configured with a set of parameters optimized for facial detection under given luminous conditions, and in each successive image, the parameters will be modified to adapt them to various conditions until a face is detected in one of the images.

All the configurations may be collated in a table, for example:

TABLE 1

| Parameter set No. | Exposure time | Gain | Infrared intensity | White light intensity |
|---|---|---|---|---|
| 1 | 0.000625 s | 1 | 0 | 0 |
| 2 | 0.01 s | 1 | 0 | 0 |
| 3 | 0.02 s | 3 | 0.1 | 0 |

For example, configuration 1 allows a face to be detected under very strong illuminance, in the case of direct illumination by the sun for example;

configuration 2 allows a face to be detected under intermediate illuminance, in the case of indirect illumination by the sun or of strong artificial ambient illumination (i.e. artificial illumination not emitted by the artificial sources of the system) for example; configuration 3 allows a face to be detected under weak illuminance or in complete darkness. To this end, in this configuration, the infrared light source 20 is switched to a level allowing the required signal to be obtained.

In succession, one image is acquired in configuration 1, then another image is acquired in configuration 2, then another image is acquired in configuration 3, then the process begins again with configuration 1, until a face is detected. If for example the sought object is a visual code, then the set of configurations will be different and tailored to visual-code mode.

Next, once the object has been detected, the method 300 passes to the phase of optimizing processing based on the detected object 150. In certain cases it is possible for there temporarily to be no object in the capture volume, this resulting in an absence of detection in step 303 and, in this case, the system 100 may for example freeze its parameters until the next detection, and for example after a given time threshold (1 second for example) loop back to the initializing step with configuration scanning.

The processing step comprises the step 304 of computing at least two metrics on all or part of the image, the first metric characterizing the infrared signal, the second metric characterizing the visible signal. Said part of the image is in particular the region of interest (ROI) of the image delineating said detected object, said object in particular being a body part, such as a face, or information, such as a visual code (e.g. a quick-response code, a machine-readable zone), especially printed on paper or displayed on an e-reader with e-ink technology.

Each metric may be at least the average over the part of the image corresponding to the ROI, on each wavelength channel. For example, let $S_{IR}$ be the average of the infrared channel, and $S_{visible}$ the average of the visible channel. In the case illustrated here of an RG-NIR device 1 with a sensor 14 with only three photosites, the visible signal comprises 2 components, a red component and a green component, and it is possible to set for example: $S_{visible}=\max(S_{red}, S_{green})$. In the case of an RGB-NIR device 1 with a sensor 14 with four photosites, the following might for example be employed: $S_{visible}=\max(S_{red}, S_{green}, S_{blue})$.

In the case of a magnifying objective, once the object 150 has been detected in the first image, a second image may be acquired with a magnification such that the entirety of the second image corresponds to the ROI of the first image, this however being tricky to do in the case of a moving person because the movement of the object must also be taken into account.

A step 305 of estimating the digital level of the signal due to ambient infrared is then carried out. To do this, a step of estimating a component $S_{IRambient}$ of the first metric $S_{IR}$ characterizing an amount of infrared signal due to ambient infrared, i.e. infrared not emitted by the sources 20, 30 of the system 100, is executed. Specifically, the first metric $S_{IR}$ characterizing the infrared signal is based on an estimate of the digital level of the signal due to the infrared present, and, given that the infrared signal in the image is the sum of the signal due to the ambient infrared illumination external to the product and of the signal due to the infrared illuminance emitted by the system, the following is obtained:

an expression for the additional signal $S_{IRadditional}$ produced by the infrared light source 20

$$S_{IRadditional} = \frac{R_{IR} \cdot DC_{IR} \cdot T_{expo} \cdot \text{Gain}}{d^2}$$

with d the distance to the object 150 estimated previously in step 303, $T_{expo}$ and Gain being the exposure time (in seconds) and gain (dimensionless) applied during acquisition of the image, $R_{IR}$ being the parameter of the system characterizing the sensitivity of the optical system (m²/s) and $DC_{IR}$ being the current duty cycle of the infrared light source 20 (dimensionless, between 0 and 1);

an expression for the ambient infrared signal $S_{IRambient}$, i.e. the infrared signal not emitted by the at least one artificial infrared and/or visible light source 20,30 (recalling that the visible light source 30 does not emit in the infrared): $S_{IRambient}=S_{IR}-S_{IRadditional}$.

Next comes a step (not shown) of computing ambient illumination distribution, in particular in the form of the ratio $$\frac{S_{IR\ ambient}}{S_{visible}}$$

of the amount of the component of the first metric characterizing the infrared signal due to ambient infrared to the second metric.

Next, step 306 of comparing said ambient illumination distribution $$\frac{S_{IR\ ambient}}{S_{visible}}$$

with said predetermined target distribution $$\frac{C_{IR}}{C_{visible}},$$

which was determined in initializing step 301, is carried out, the infrared-signal control setpoint being dependent on said comparison, and the visible-signal control setpoint in particular being dependent on said comparison.

Specifically, depending on said comparison, it is decided whether to seek to servo-control the visible signal of the source 30 or rather the infrared signal of the source 20: if $$\frac{S_{IR\ ambient}}{S_{visible}} < \frac{C_{IR}}{C_{visible}},$$

then the case is the nominal case where there is less infrared than visible. In this case, the visible signal will be servo-controlled to the predetermined target visible digital level, which becomes the visible setpoint;

otherwise, there is more infrared than visible, and the infrared signal will be servo-controlled to the infrared setpoint.

Below, S is defined to be the signal that will be servo-controlled, which is equal to $S_{IRambient}$ or to $S_{visible}$ depending on the criterion thus defined, and C is defined to be the setpoint to which it will be servo-controlled, i.e. the digital level $C_{IR}$ or $C_{visible}$ depending on the same criterion, respectively.

Sometimes a setpoint may have already be achieved, in particular intrinsically depending on the proximity of the place in question to a window for example.

Lastly, the processing step comprises:
- a step 307 of computing exposure parameters of the acquiring device 1 to be applied, such as gain and/or exposure time, in particular depending on the ratio of the at least one control setpoint to said associated signal to be servo-controlled, to achieve said at least one control setpoint;
- a step 308 of computing the drive command for the artificial infrared light source;
- a step 309 of computing the drive command for the artificial white, i.e. visible, light source.

More precisely, in step 307 of computing new exposure parameters:

S is optionally corrected using a non-linear law (typically a polynomial, for example of degree 3) allowing any saturation of the signal to be taken into account and compensated for, this corrected value being denoted S';

The ratio Ratio=C/S', which corresponds to the gain that must be applied to the analysed image to achieve the target, is computed;

Ratio is restricted to between a lower bound ratio_min, which is for example set to 0.1, and an upper bound ratio_max, which is for example set to 10;

The new product E=$T_{expo}$·Gain·Ratio is deduced therefrom.

It is then a question of distributing $T_{expo}$' and Gain' such that $T_{expo}$'·Gain'=E, by following an optimization strategy allowing gain or exposure time to be optimized, this strategy being dependent on the desired performance (in particular in terms of motion blur and noise). Specifically, exposure time and gain act proportionally on the image, and hence a synergy results and their definition is then based on a compromise because lengthening exposure time may create motion blur (a maximum motion blur may be defined depending on the application and the associated algorithm) while increasing gain results in increased noise.

For example, the exposure time $T_{expo}$' is first defined to be as long as possible while remaining less than E, within the limit of a maximum exposure time (for example 20 ms or 40 ms), and then Gain'=E/$T_{expo}$' is deduced;

It is also possible to advantageously privilege exposure times that are multiples of the period of the ambient lighting (for example 10 ms in Europe and 8.33 ms in the United States of America) to avoid flickering effects due to non-DC lighting;

It is also possible to avoid updating these configuration parameters of the sensor 14 in the case where the variation with respect to the preceding image would be very small (for example variation <10%), this allowing an image that is more stable in terms of brightness to be obtained. Specifically, since the measurements are noisy, small variations may be due to measurement noise (for example in the distance estimate) rather than a true variation in ambient brightness.

More precisely, in step 308 of computing the drive command for the artificial infrared light source 20, the additional infrared signal $S_{IRadditonal}$' that it is desired to obtain in the next image is first computed based on the target infrared setpoint $C_{IR}$ (target infrared digital level), and on the ambient infrared signal $S_{IRambient}$' expected in the next image, in light of the current ambient infrared signal $S_{IRambient}$ and the ratio Ratio that will be applied to the exposure of the device 1:

$$S'_{IR\ ambient} = \text{Ratio} \cdot S_{IR\ ambient}, \text{ this giving}$$

$$S'_{IR\ additional} = C_{IR} - \text{Ratio} \cdot S_{IR\ ambient}$$

Next, the new duty cycle $DC_{IR}$' for the infrared illumination is computed according to:

$$DC'_{IR} = \frac{S'_{IR\ additional} \cdot d^2}{R_{IR} \cdot T'_{expo} \cdot \text{Gain}'}$$

In step 309 of computing the drive command for the artificial white light source 30, given the desired quality level in terms of noise in the image, in the context where visible images are exploited, and given that noise increases with the gain of the device 1 (at equal output signal level), it is necessary for the gain of the device 1 not to exceed a certain level.

Here, the command for the artificial white light source 30 is a binary, all-or-nothing command, i.e. the source is either turned on or turned off, for the sake of simplicity, but its intensity could as a variant be modulated. Thus,

- if the white light source 30 is turned off and $T_{expo}'\cdot\text{Gain}' \geq \text{Threshold}_{turn\text{-}on}$ then the white light source 30 is turned on, for example with the turn-on threshold $\text{Threshold}_{turn\text{-}on} = 4 \times 0.02$ (gain of 4 and exposure time of 20 ms);
- if the white light source 30 is turned on and $T_{expo}'\cdot\text{Gain}' < \text{Threshold}_{turn\text{-}off}$ then the white illumination is turned off, the turn-off threshold $\text{Threshold}_{turn\text{-}off}$ being chosen so that turning on the white illumination of the observed object does not cause enough of a drop in gain that the next iteration is passed to, i.e. the next image acquired, below the turn-off threshold, as this would cause flashing and system instability: for example, $\text{Threshold}_{turn\text{-}off} = 1 \times 0.02$ (gain of 1 and exposure time of 20 ms), with illumination generating about 50 lux on the object.

From the moment when the illumination is turned on, it is also advantageously possible not to switch it off before a certain time has elapsed, in order to avoid user discomfort.

Preferably, the two drive commands, for the artificial infrared light source 20 and the artificial white light source 30, are defined in each iteration.

In the above description of the acquiring method 300, only the value of the ambient infrared signal, i.e. the infrared signal not emitted by the artificial infrared light source 20 or by the artificial visible light source 30 of the system 100, is computed because it is preferred to modulate the infrared signal rather than the visible signal so as to avoid the need to turn on the visible light source 30.

Nevertheless, the value of the ambient visible signal $S_{ambient\ visible}$ not emitted by the sources 20,30 of the system 100 (in particular 30 here because the source 20 intrinsically generates only infrared) and the additional signal $S_{additional\ visible}$ produced by the light source 30 could also be computed, so as to avoid any deviation on turn-off of the visible light source 30 and the associated reconvergence time.

This iterative-control-based acquiring method 300 makes it possible to:

a. optimize the exposure time and gain of the sensor, depending on the ambient visible illuminance, to achieve a target level $C_{visible}$ in the visible image;
b. continuously adjust the intensity of the infrared illumination so that the infrared image achieves a determined target $C_{IR}$ (in addition to the infrared component already present in the ambient illumination);
c. turn on the visible light source 30 (here in an all-or-nothing manner) in the case where a lack of visible light is detected, and turn it off when the visible illumination again becomes sufficient.

Figure 4:
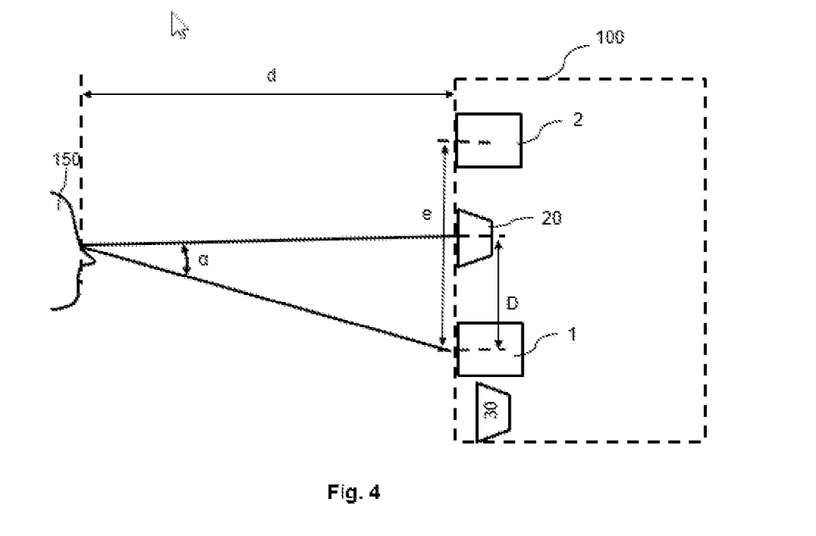
FIG. 4 schematically shows an image-acquiring system according to another embodiment of the invention.

FIG. 4 schematically illustrates an image-acquiring system according to another embodiment of the invention. Specifically, the acquiring system 100 here comprises not only the acquiring device 1 by which a visible image $I_{vis}$ and an infrared image Ira are captured, but also comprises another visible-image-acquiring device 2, this other device being sensitive only to the visible (such as an RGB camera) and operating at the same time as the RG-NIR-image-acquiring device 1.

The exposure parameters of this other device 2—exposure time and gain—are then controlled using an algorithm independent of the RG-NIR-image-acquiring device 1.

The image acquired by this other device 2 is in particular used to provide video feedback to the user and for biometric-recognition purposes.

Furthermore, by coupling this image with the visible image of the RG-NIR-image-acquiring device 1, planar-type fraud may be detected through stereoscopy. A 3D model of the targeted object is obtained. This 3D model is used to detect planar-type fraud, or any type of fraud the overall shape of which does not correctly fit that of a face. The spacing e between the two devices 1,2 is about 16 cm, this allowing planar-type fraud to be detected at up to about 90 cm.

It is then advantageous to position the infrared light source 20 so that it makes an angle α larger than 5° to the RG-NIR-image-acquiring device 1, as seen from the face 150. The advantage thereof is that it prevents a bright-pupil effect dependent on the distance of the person, which would introduce variability into the images, and thus decrease fraud-detection performance, from being generated. Given the depth of the capture volumes here (distance d of the order of about 40-90 cm), this implies a distance D of 6.5 cm to 7.5 cm between the RG-NIR-image-acquiring device 1 and the infrared light source 20.

Advantageously, the infrared channel, or all the channels of the second camera, are processed using artificial intelligence, in order to detect fraud of 3D-mask type.

Combination of these types of processing allows fraud of all types to be detected, and biometric recognition to be ensured under all luminous conditions.

Stereoscopy also allows the distance d to be accurately determined.

The processing module 16 then in particular communicates via its communication interface 165 with the cameras of the two devices 1, 2.

Figure 5:
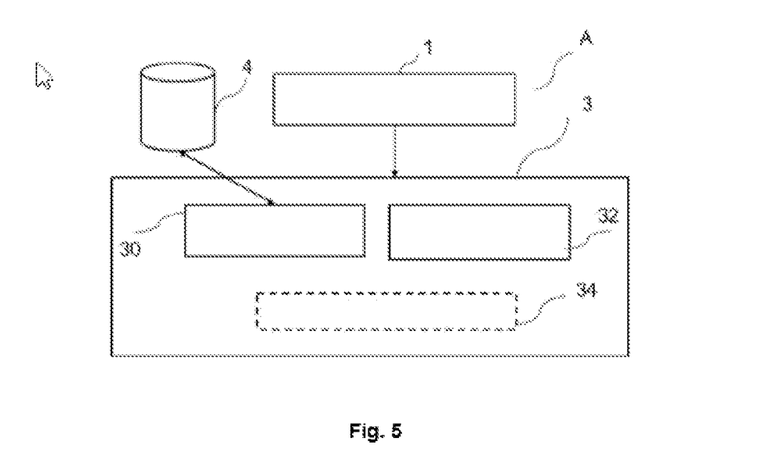
FIG. 5 shows an authenticating device according to one embodiment.

FIG. 5 illustrates an authenticating device A according to one embodiment. The device A for authenticating a body part comprises an image-acquiring system such as the acquiring system 1 described with reference to FIG. 1, and an image-analysing module 3.

The image-processing module 3 comprises a module 30 for recognising a body part, such as a face, and a fraud-detecting module 32. It may optionally comprise a module 34 for activating access to a place, e.g. a building, a room, etc.

The body-part-recognising module 30 is connected to a database 4. The database 4 may form part of the authenticating device A or may be external thereto. The database stores images or descriptors of images of the body parts of authorized persons, e.g. persons authorized to access a building.

Figure 6:
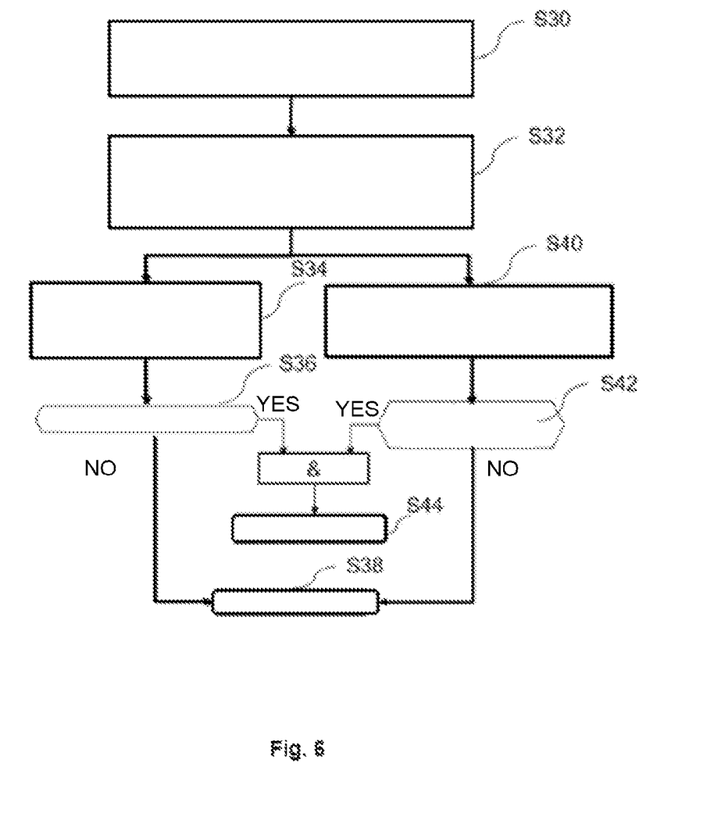
FIG. 6 illustrates an authenticating method according to one embodiment.

FIG. 6 illustrates an authenticating method such as implemented by the authenticating device A of FIG. 4.

A user wishing to be authenticated presents her or his face in front of the image-acquiring system 1.

In a step S30, a raw image of a face 150 illuminated by infrared and visible light is obtained by the acquiring system 1.

In a step S32, a colour image $I_{vis}$ and an infrared image $I_{IR}$ are obtained by the acquiring system 1 using optimized configuration parameters. Known demosaicing algorithms may be applied to obtain the missing values of each pixel. Such an algorithm allows a value R and a value G to be obtained for each pixel of the colour image, and a value IR to be obtained for each pixel of the infrared image.

In a step S34, a facial recognition algorithm is applied. For example, the obtained colour image $I_{vis}$ is processed, e.g. segmented, to extract a face. The extracted face is then compared with the facial images or their descriptors stored in the database 4. If the extracted face is close in the sense of a certain metric to a face of the database 4, then the extracted face is recognized, otherwise the face is unknown. As a variant, the facial recognition algorithm uses the colour image $I_{vis}$ and the infrared image $I_{IR}$. In case S36 where the face is unknown, access is denied in step S38.

In a step S40, a fraud detection algorithm is applied. For this purpose, the infrared image $I_{IR}$ is used. As a variant, the infrared image $I_{IR}$ and the colour image $I_{vis}$ are used. A neural network may be used for this purpose.

In case S42 where fraud is detected, i.e. the face is not authentic (e.g. use of a mask), access is denied in step S38.

Access is permitted in a step S44 only in the case where the face 150 has been recognized and authenticated.

In one particular embodiment, an image i' is generated by concatenating the images $I_{IR}$ and $I_{vis}$. For this purpose, a demosaicing method is applied to the images $I_{IR}$ and $I_{VIS}$, that is after correction with calibration parameters. The image I' therefore has 3 components R, G and IR. This image I' is then used in steps S34 and S40 by facial-recognition and fraud-detection algorithms. These algorithms may use convolutional neural networks that learnt their coefficients on images of the same type as image I'. For this purpose, a residual neural network (resnet) may be used. Such networks are in particular described in the document by He et al. titled "Deep residual learning for image recognition" and published in 2016 in Proceedings of the IEEE Conference on Computer Vision and Pattern Recognition (pp. 770-778).

In another embodiment, the colour image his with two components R and G is colourized in order to recreate the blue component and thus obtain an image I" having 3 components R, G and B. The method described in the document by Zhang et al. titled "Colorful image colorization" and published in ECCV in October 2016 is one example of a colourizing method based on convolutional neural networks.

This solution makes it possible to apply conventional facial recognition algorithms, which conventionally use RGB colour images. The algorithm described in the document by Parkhi et al. titled "Deep face recognition" and published in September 2015 in BMVC (Vol. 1, No. 3, p. 6) is one example of such a facial recognition algorithm. The image I" is used by the facial recognition algorithm in S34. The fraud detection algorithm may use, in S40, either only the image $I_{IR}$, or the image $I_{IR}$ and the image I". For this purpose, the algorithm described in the document by Agarwal et al titled "Face presentation attack with latex masks in multispectral videos" and published in 2017 in Proceedings of the IEEE Conference on Computer Vision and Pattern Recognition Workshops (pp. 81-89) may be used.

Colourization is particularly useful when viewing or exporting images.

Preferably, the entirety of the authenticating method is implemented by the processing module 16, whether this module is centralized or not.

The invention claimed is:

1. A system for acquiring a colour image ($I_{vis}$) and an infrared image ($I_{IR}$) of a scene, said acquiring system comprising:
   an image-acquiring device, said device being sensitive to visible and infrared wavelengths, comprising:
   a sensor;
   an objective configured to focus light input into the acquiring device onto the sensor, a dual-band bandpass filter being placed in front of the sensor, and between the objective and said sensor;
   a processing module connected to said image-acquiring device and configured to separate, once output by the sensor, the infrared image ($I_{IR}$) and the visible image ($I_{vis}$) and to define at least one signal to be servo-controlled and an associated control setpoint (C), said at least one control setpoint being an infrared-signal control setpoint ($C_{IR}$) and/or visible-signal control setpoint ($C_{visible}$) depending on which at least one artificial light source is driven;
   the at least one artificial light source illuminating said scene, said at least one source comprising an artificial infrared light source emitting a light signal in the infrared and/or an artificial visible light source emitting a light signal in the visible.

2. The acquiring system according to claim 1, wherein said image-acquiring device comprises a dual-band bandpass filter:
   in the case of a sensor with at least four different photosites, the first passband of the filter is configured to let pass visible wavelengths, and in the case of a sensor with three different photosites, the first passband of the filter is configured to attenuate the blue component of the light, with a first passband extending between 530 and 650 nm; and
   the second passband is configured to let pass infrared wavelengths.

3. The acquiring system according to claim 2, wherein the second passband extends from 760 nm to 800 nm.

4. The acquiring system according to claim 1, wherein:
   the artificial light source emitting in the infrared is configured to emit, in a working-distance range from 40 to 100 cm, a signal equivalent to the signal generated by bright external ambient visible light, the spectrum of which extends from 800 to 875 nm and/or
   the artificial light source emitting in the visible is configured to satisfactorily illuminate in complete darkness at a working distance of about 70 cm.

5. The acquiring system according to claim 1, wherein the system comprises another image-taking device sensitive only in the visible, synchronized with the acquiring device and the exposure parameters of which are controlled independently of those of the acquiring device.

6. A device (A) for authenticating a body part, comprising:
   an image-acquiring system according to claim 1; and
   the processing module being configured to detect a body part based on the received image and to perform an authentication of said detected body part based on said colour and infrared images ($I_{vis}$, $I_{IR}$).

7. A method for acquiring a colour image ($I_{vis}$) and an infrared image ($I_{IR}$) of a scene, said acquiring method comprising steps of:
   receiving an image ($I_B$) from an image-acquiring device sensitive to visible and infrared wavelengths;
   processing said received image ($I_B$), said separating the infrared image and the visible image and defining at least one signal to be servo-controlled and an associated control setpoint, said at least one control setpoint (C) being an infrared-signal control setpoint ($C_{IR}$) and/or visible-signal control setpoint ($C_{visible}$) depending on which at least one artificial infrared and/or visible light source is driven.

8. The acquiring method according to claim 7, wherein the processing step comprises a step of detecting an object in the colour and/or infrared image and of determining the distance (d) between the detected object and said acquiring device.

9. The method for authenticating a body part, wherein the method comprises:
  acquiring a colour image ($I_{vis}$) and an infrared image ($I_{IR}$) of said body part using the acquiring method according to claim 8, and wherein the detected object is a body part; and
  authenticating the body part based on said colour and infrared images ($I_{vis}$, $I_{IR}$).

10. The acquiring method according to claim 8, wherein said part of the image is a region of interest of the image delineating said detected object, said object being a body part or a visual code printed on a physical document.

11. The acquiring method according to claim 7, wherein the processing step comprises a step of computing at least two metrics ($S_{IR}$, $S_{visible}$) from all or part of the image, the first metric ($S_{IR}$) characterizing the infrared signal, the second metric ($S_{visible}$) characterizing the visible signal.

12. The acquiring method according to claim 11, wherein the at least two metrics ($S_{IR}$, $S_{visible}$) are computed as being at least the average over all or said part of the image on each wavelength channel of said characterized signal.

13. The acquiring method according to claim 11, wherein the processing step comprises:
  a step of estimating a component ($S_{IR\ ambient}$) of the first metric characterizing an amount of infrared signal due to ambient infrared, i.e. infrared not emitted by the at least one artificial infrared and/or visible light source, and;
  a step of computing the ambient illumination distribution $$\left(\frac{S_{IR\ ambient}}{S_{visible}}\right),$$

in the form of the ratio of the amount of the component of the first metric characterizing the infrared signal due to ambient infrared from a non-artificial source to the second metric, and;
  a step of comparing said distribution $$\left(\frac{S_{IR\ ambient}}{S_{visible}}\right)$$

with a predetermined target distribution $$\left(\frac{C_{IR}}{C_{visible}}\right),$$

and wherein the infrared-signal control setpoint ($C_{IR}$) is dependent on said comparison, and wherein the visible-signal control setpoint ($C_{visible}$) is dependent on said comparison.

14. The acquiring method according to claim 7, wherein the processing step comprises:
  a step of computing an exposure parameter of the acquiring device to be applied, such as gain and/or exposure time, depending on the ratio of the at least one control setpoint ($C_{IR}$, $C_{visible}$) to said associated signal to be servo-controlled, to achieve said at least one control setpoint; and/or
  a step of computing a drive command for the artificial infrared and/or visible light source.

15. The acquiring method according to claim 7, wherein the method comprises an initializing step that performs an iterative scan of configurations until detection of the object, each configuration comprising at least one exposure parameter, such as gain and/or exposure time, and an intensity parameter of the at least one artificial light source, the values of said parameters being set to predetermined values in each configuration.

* * * * *